(12) United States Patent
Wei (10) Patent No.: US 7,977,816 B2
(45) Date of Patent: Jul. 12, 2011

(54) DC/DC BOOST CONVERTER WITH BYPASS FEATURE

(75) Inventor: Dazhi Wei, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 184 days.

(21) Appl. No.: 12/339,767

(22) Filed: Dec. 19, 2008

(65) Prior Publication Data

US 2010/0156175 A1      Jun. 24, 2010

(51) Int. Cl.
*H02J 3/14* (2006.01)
(52) U.S. Cl. .......................................... 307/31
(58) Field of Classification Search .............. 307/31, 307/30; 323/282; 363/74, 21.01, 78
See application file for complete search history.

(56) References Cited

U.S. PATENT DOCUMENTS

| 5,801,519 | A * | 9/1998 | Midya et al. | 323/222 |
|---|---|---|---|---|
| 6,967,851 | B2 * | 11/2005 | Yang et al. | 363/16 |
| 7,560,910 | B2 * | 7/2009 | Hata et al. | 323/222 |
| 7,622,963 | B2 * | 11/2009 | Westwick | 327/90 |

* cited by examiner

*Primary Examiner* — Albert W Paladini
(74) *Attorney, Agent, or Firm* — Howison & Arnott (57) ABSTRACT

An integrated circuit package includes a DC/DC boost converter for providing an output voltage at a program level to associated components of the integrated circuit package. The DC/DC boost converter includes a first mode of operation wherein the DC/DC boost converter is enabled responsive to an input battery voltage falling below a programmed level of the output voltage. The DC/DC boost converter also includes a second mode of operation wherein the DC/DC boost converter is disabled responsive to the input battery voltage being above the programmed level of the output voltage.

15 Claims, 5 Drawing Sheets

DC/DC BOOST CONVERTER WITH BYPASS FEATURE

TECHNICAL FIELD

The present invention relates to DC/DC boost converters, and more particularly, to a DC/DC boost converter including a mode of operation for enabling/disabling the boost converter responsive to a comparison between a provided input voltage and a desired output voltage of the boost converter.

BACKGROUND

A boost converter is used for providing a higher output voltage responsive to a lower provided voltage source. Thus, an input voltage source from, for example a battery, may be received by the DC/DC boost converter and boosted to a desired output voltage necessary for operating components associated with the converter. DC/DC boost converters may be implemented within various microcontroller units to power the various circuitries and components within the microcontroller unit. Differing types of microcontroller units may include configurations wherein the use of the DC/DC boost converter is in fact unnecessary during operations of the MCU device. For example, if a source voltage provided from a battery or series connection of batteries to the DC/DC converter rises over a sufficient range necessary to support the voltage needs of the MCU device, the situation may arise wherein at higher voltage conditions within the associated battery source the DC/DC converter is not actually necessary to maintain the required power for operating the MCU device. However, the DC/DC boost converter is necessary for situations wherein the battery drops below particular voltage levels, and the operation of the boost converter maintains the operation of the MCU device. Thus, there is a need for addressing this situation when the DC/DC boost converter is sometimes unnecessary to the operation of a particular MCU.

SUMMARY

The present invention as disclosed and described herein, in one aspect thereof, comprises an integrated circuit package. The integrated circuit package includes a DC/DC boost converter for providing an output voltage at a programmed level for associated components of the integrated circuit package. The DC/DC boost converter includes a first mode of operation wherein the DC/DC boost converter is enabled responsive to the input battery voltage falling below the programmed level of the output voltage. The converter also includes a second mode of operation wherein the DC/DC boost converter is disabled responsive to the input battery voltage being above the programmed level of the output voltage.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of a DC/DC boost converter with bypass feature are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Figure 1:
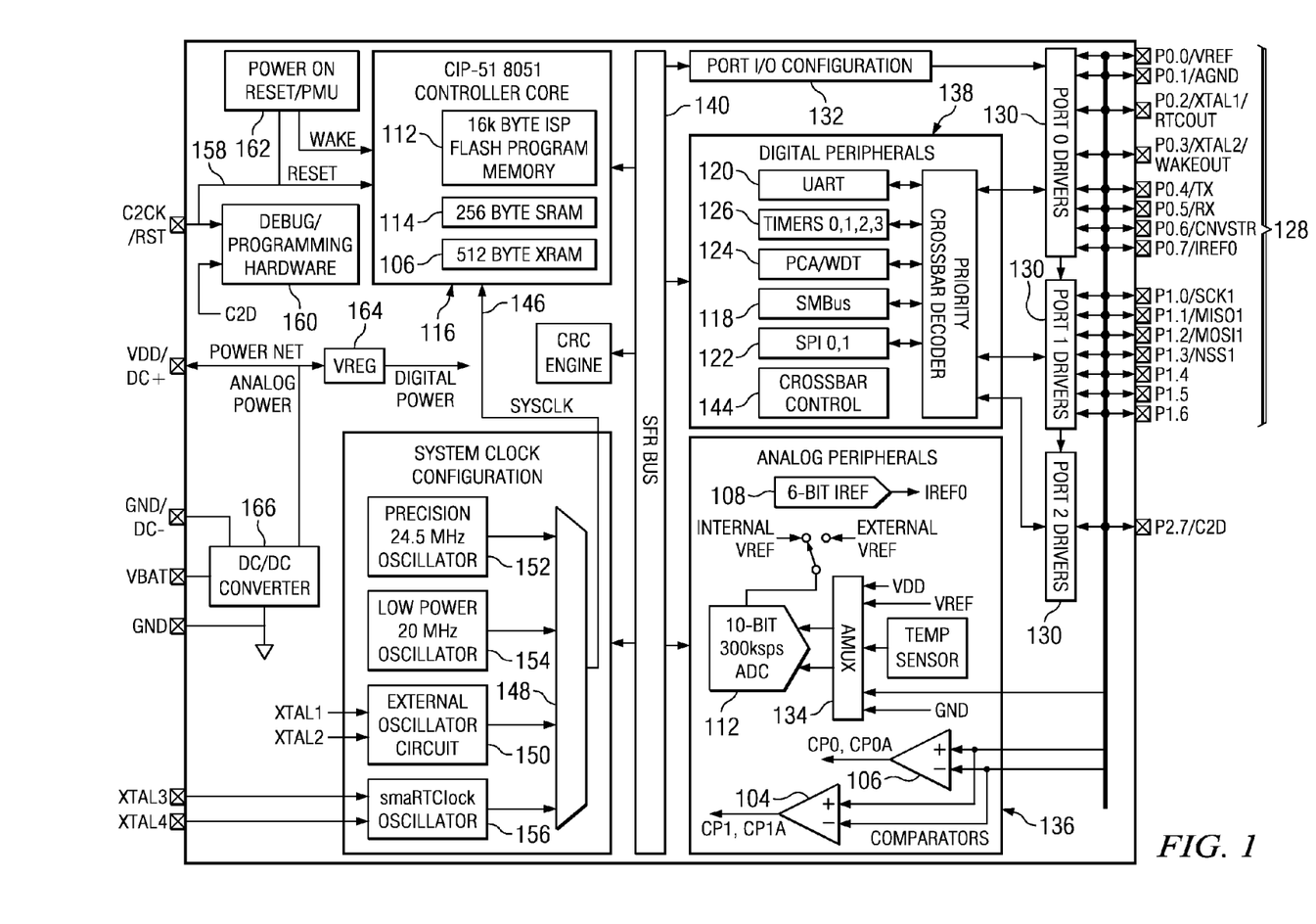
FIG. 1 illustrates a block diagram of an MCU controller including a DC/DC boost converter with a bypass mode of operation.

Referring now to FIG. 1, there is illustrated an integrated circuit that is comprised of a fully integrated mixed signal system on a chip with a 10 bit multichannel ADC 102, 2 voltage comparators 104 and 106, a 6 bit current reference 108 and an 8051 compatible microcontroller core 110 with 16 kB of flash memory 112. The microcontroller core 110 also includes 256 bytes of SRAM memory 114 and 512 bytes of XRAM memory 116. There is also provided an I²C/SMBus 118, a UART 120 and a SPI 122 serial interface implemented in hardware (not "bitbanged" in user software) as well as programmable counter array/watch dog timer 124 and various system timers 126. There are also provided 16 general purpose port I/Os 128 that are driven by a number of port drivers 130. The port drivers 130 are configured via a port I/O configuration logic 132.

The analog peripherals include a multiplexer 134 which is operable to interface analog inputs to the analog-to-digital converter 102. The microcontroller core 110 effectively configures and manages the analog peripherals 136 and the digital peripherals 138. The flash memory 112 can be reprogrammed even in circuit providing non-volatile data storage, and also allowing field upgrades of the 8051 firmware. The MCU 100 can also individually shut down any or all of the various peripherals to conserve power. The processing core 110 is interfaced through an internal SFR bus 140 to the various input/output blocks. A priority crossbar decoder 142 under the control of a crossbar control logic 144 provides an interface between the UART 130, timers 126, PCA/watch dog timer 124, SMBus 118 and SPI interface 122 with the digital I/O output pins 128. This is a configurable interface. The priority crossbar decoder 142 can be configured to interface with any of the ports of the I/O side thereof which provide interface between the crossbar 142 and the core 110. Further, the crossbar decoder 142 can interface through any of the functional blocks 118 through 126 directly to the SFR bus 140. The crossbar control block 144 is configured by the processing core 110. In addition, the processing core 110 is operable to configure the analog peripherals 136.

The processing core 110 is controlled by a clock provided via system clock line 146. The clock is selected from one of four sources with a multiplexer 148. The first source is an external oscillator circuit 150. The multiplexer 148 may also select one of an internal 24.5 MHz precision oscillator 152 or a low power 20 MHz internal oscillator 154. The multiplexer 148 may also provide a clock signal from a real time clock oscillator 156. The processing core 110 is also controlled by a reset input on reset line 158.

The debugging/programming hardware 160 allows non intrusive, full speed in circuit debugging using the MCU processing core 110. This debug hardware 160 supports inspection, modification of memory and registers, setting break points, single stepping, run and halt commands. All analog and digital peripherals are fully functional while debugging using C2. The C2 interface pins can be shared with user functions allowing in system debugging without occupying package pins. The CRC engine enables CRC checks of data.

The power on reset/PMU module 162 allows the generation of reset and wake up signals to the processing core 110. The voltage regulator 164 provides a regulated voltage to the digital peripheral components 138 responsive to the system power $V_{DD}$ provided via the power net or from the DC/DC boost converter 166.

The DC/DC boost converter 166 allows operation from a single cell battery with a supply voltage as low as 0.9 volts. The DC/DC boost converter 166 is a switching boost converter with an input voltage range of 0.9 to 3.6 volts and has a programmable output voltage range of 1.8 to 3.3 volts. The default output voltage is 1.9 volts. The DC/DC boost converter 166 can supply the chip with up to 65 milliwatts of regulated power and can be used for powering other devices in the system. This allows the most flexibility when interfacing to sensors and other analog signals which typically require higher supply voltages than a single cell battery can provide.

Figure 2:
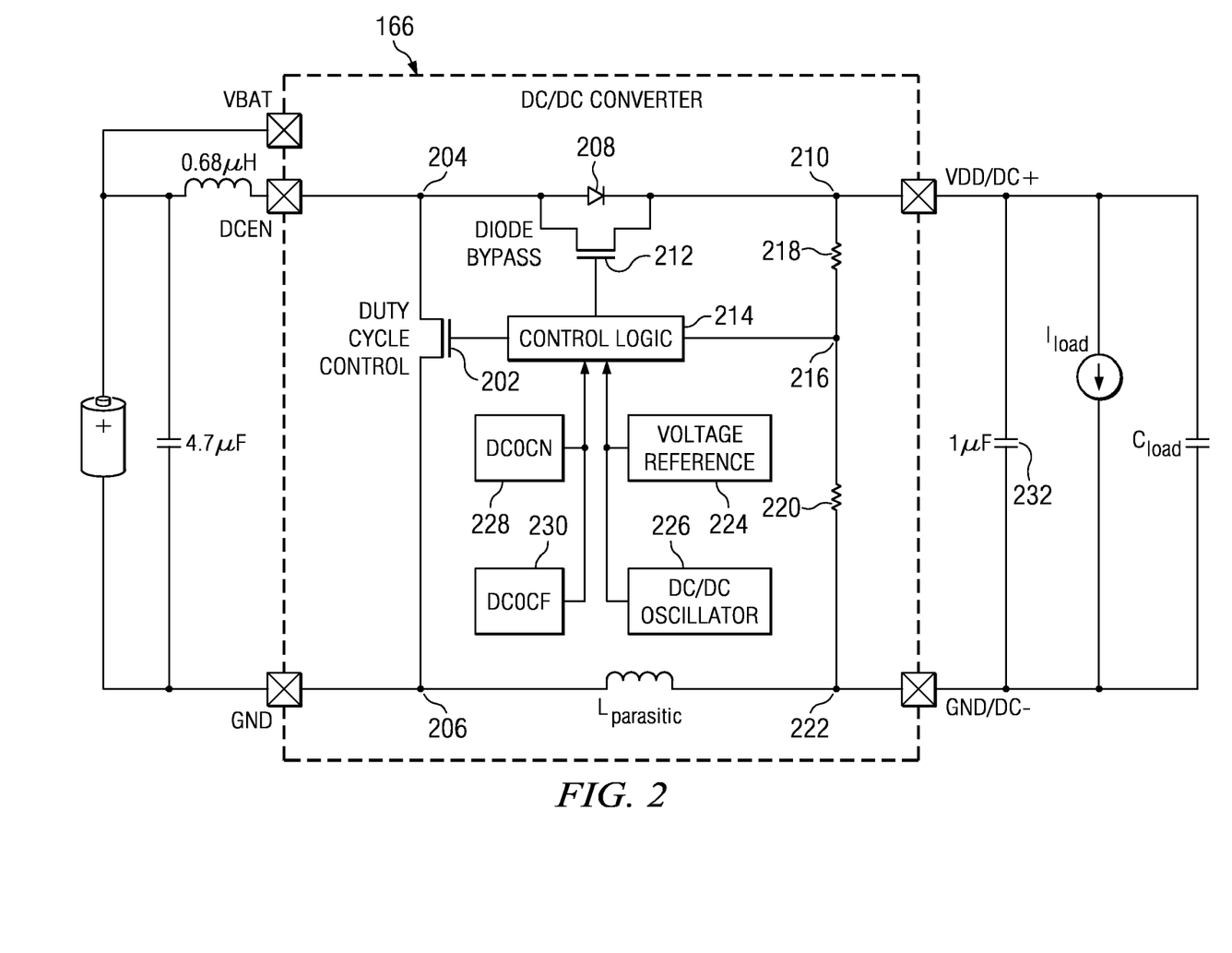
FIG. 2 is a block diagram of the DC/DC boost converter.

Referring now to FIG. 2, there is illustrated a block diagram of the DC/DC boost converter 166. The DC/DC boost converter 166 includes a ground pin GND, an input voltage pin VBAT, a DCEN pin, output pin $V_{DD}$/DC+ pin and GND/DC− pin. A duty cycle control switch is connected between the DCEN pin at node 204 and ground at node 206. An anode of diode 208 is connected to node 204 and the cathode of the diode is connected to node 210 at the $V_{DD}$/DC+ pin. A diode bypass switch 212 is connected across the diode 208 between nodes 204 and 210. Switching transistors 202 and 212 have their gates connected to receive control signals from control logic 214. The control logic 214 monitors the output voltage at node 216 of a voltage divider consisting of a resistor 218 connected between node 210 and 216 and a resistor 220 connected between node 216 and node 206 at ground. A parasitic inductance $L_{parasitic}$ is between node 206 and node 222. The control logic 214 receives a voltage reference from a reference voltage generator 224 and an oscillator signal from a DC/DC oscillator 226. Control registers DCOCN 228 and DCOCF 230 are used for providing control bits to the control logic 214.

During normal operation in the first half of the switching cycle, the duty cycle control switch 202 is closed and the diode bypass switch 212 is open. Since the output voltage is higher than the voltage at the DCEN pin, no current flows through the diode 208 and the load is powered by the output capacitor 232. During this stage, the DCEN pin is connected to ground through the duty cycle control switch 202, generating a positive voltage across the 0.68 uH inductor and forcing the inductive current to ramp-up.

In the second half of the switching cycle, the duty cycle control switch 202 is opened and the diode bypass switch 212 is closed. This connects the DCEN pin directly to $V_{DD}$/DC+ and forces the inductor current to charge the output capacitor 232. Once the inductor transfers its stored energy to the output capacitor 232, the duty cycle control switch is closed, the diode bypass switch is opened and the cycle repeats.

The DC/DC boost converter 166 has a built in voltage reference 224 and oscillator 226 and will automatically limit or turn off the switching activity when the peak conductor current rises above a safe limit or the output voltage rises above the programmed target value. This enables the DC/DC converter 166 output to be safely overridden by secondary power sources in order to preserve battery life. The DC/DC converter 166 settings can be modified using SFR registers 228 and 230 which provide the ability to change the target output voltage, oscillator frequency or source, diode bypass switch resistance, peak inductor current and minimum duty cycle responsive to control bits established by the processing core 110.

Figure 3A:
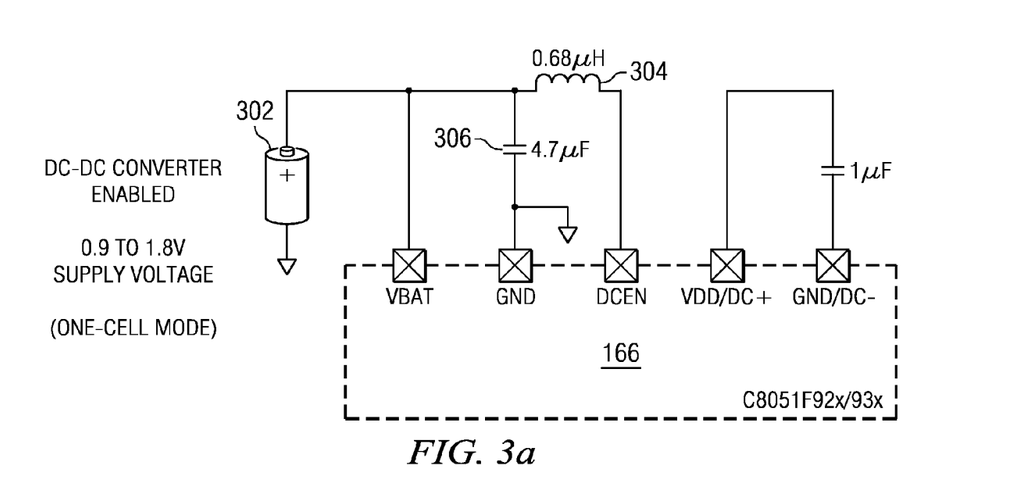
FIGS. 3a and 3b are block diagrams of the DC/DC boost converter in the one cell and two cell modes of operation.
Figure 3B:
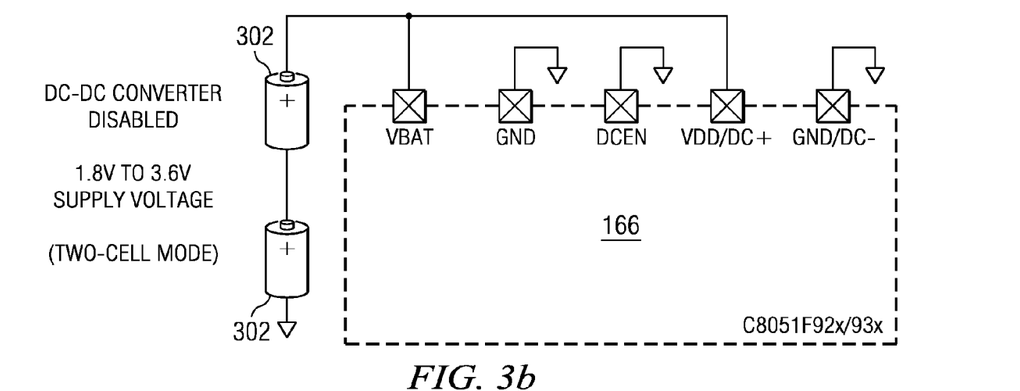

Referring now to FIGS. 3a and 3b, there are illustrated the one cell mode (FIG. 3a) and two cell mode (FIG. 3b) of operation of the DC/DC boost converter 166. In the one cell mode of operation, only a single battery 302 is connected to the VBAT terminal of the DC/DC boost converter 166. The battery 302 is also connected to DCEN pin through an inductor 304 and to the ground pin through a capacitor 306. In the two cell mode of operation, the batteries 302 are connected to the VBAT pin and the $V_{DD}$/DC+ pin. On power on reset, the state of the DCEN pin is sampled to determine if the device will power up in one cell or two cell mode. In two cell mode, the DC/DC converter will remain in a disabled mode of operation. In one cell mode, as will be more fully described herein below, the DC/DC converter 166 may operate in a bypass mode of operation wherein the DC/DC boost converter 166 is disabled when the input voltage provided by the two batteries rises above a desired output voltage. The DC/DC converter 166 is enabled in the one cell mode of operation by placing the inductor 304 between the DCEN pin and the VBAT pin. The DC/DC converter 166 is placed in the completely disabled mode by shorting the DCEN pin directly to ground as illustrated in FIG. 3b.

When the input voltage to the VBAT pin of the DC/DC boost converter 166 is larger than a programmed output of the DC/DC boost converter 166, the boost converter 166 is not switching and therefore can be shut off to save some bias currents. The DC/DC boost converter 166 includes a comparator to detect the voltage polarity across the diode bypass switch 212 (FIG. 2) to determine "on" and "off" states of the switch. Due to the comparator offset or the small current flow, the comparator may frequently turn the switch "on" and "off" causing some noise or efficiency problems within the boost converter 166. In a bypass mode of operation, this can be avoided as the comparator and the remainder of the DC/DC boost converter is shut off, and the diode bypass switch 212 is forced on.

As described previously, the DC/DC boost converter 166 may operate in a forced bypass mode wherein the DC/DC boost converter 166 is shut off and the diode bypass switch 212 is forced on regardless of the relationship between the input voltage VBAT and the output voltage programmed to be provided by the DC/DC boost converter 166. However, in a monitored bypass mode, as more fully illustrated in FIG. 4, a comparator 402 may be included to compare the input voltage against a programmed output voltage. If the input voltage is larger than the programmed output voltage, the DC/DC boost converter 166 is shut off and the diode bypass switch 212 is forced on providing the bypass mode. Otherwise, the DC/DC boost converter remains on and operates in the normal fashion providing the programmed output voltage.

Figure 4:
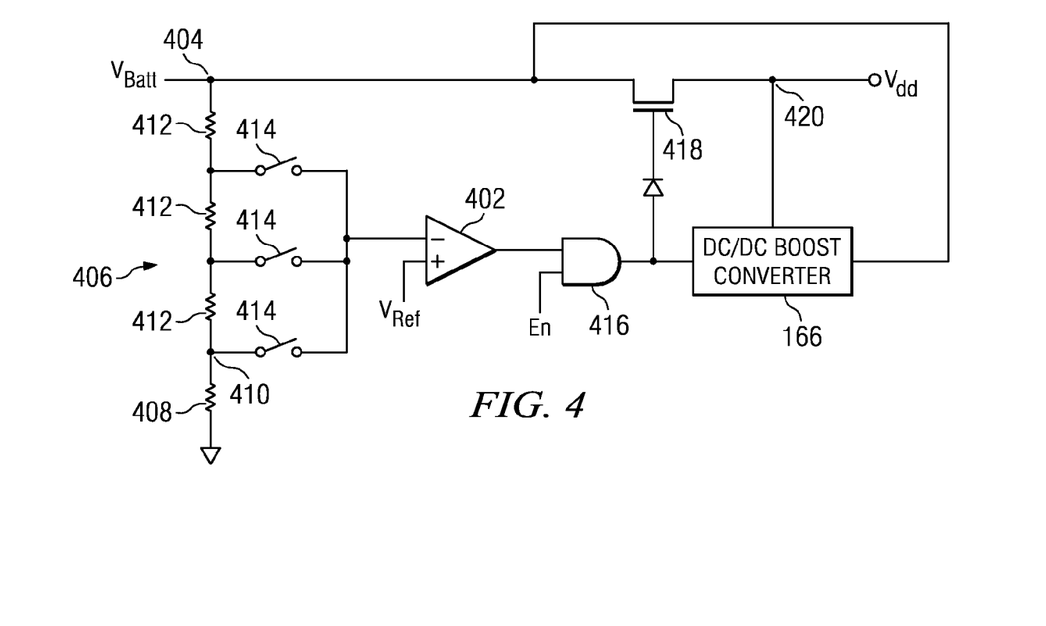
FIG. 4 illustrates the circuitry for operating the DC/DC boost converter in the bypass mode of operation.

Referring now more particularly to FIG. 4, the battery voltage VBAT is provided at a node 404. The battery voltage is provided through a resistor divider network 406. The resistor divider network 406 consists of a first resistor 408 connected between node 410 and ground. A selected one of a series of resistors 412 are connected between node 404 and node 410 to provide a desired portion of the input battery voltage VBAT to an inverting input of the comparator 402.

The particular resistor 412 that is the upper portion of the voltage divider network 406 is selected via a number of switches 414 under control of the processing core 110. The portion of the battery voltage that is applied to the inverting input of the comparator 402 is based upon the reference voltage that is applied to the non-inverting input of the comparator 402. The reference voltage $V_{REF}$ will be provided by a band gap generator within the microcontroller unit 100. The battery voltage provided to the inverting input of the comparator 404 will be scaled down from the battery voltage VBAT in the same proportion that the reference voltage $V_{REF}$ applied to the non-inverting input of the comparator 402 is scaled down from the programmed output voltage that is desired from the DC/DC boost converter 166.

The comparator 402 compares the input voltage provided from the battery with the programmed output voltage represented by $V_{REF}$. If the input battery voltage exceeds the programmed output voltage, the output of the comparator 402 goes to a logical low level. If the battery voltage falls below the programmed output voltage represented by $V_{REF}$, the output of the comparator 402 goes to a logical high level. The comparator 402 includes 100 millivolts of hysteresis in order to prevent the output of the comparator from switching between "1" and "0" due to system or environmental conditions that do not directly reflect the output voltage dropping above or below the programmed output voltage of the boost converter 166. The output of the comparator 402 is connected to one input of an AND gate 416. The other input of the AND gate 416 is connected to an enable bit indicating that the DC/DC boost converter 166 is to be enabled. The output of the AND gate 416 is connected to an enable pin of the DC/DC boost converter 166. Thus, when the output of the AND gate 416 indicates that both the enable input indicating enablement of the DC/DC boost converter by the microcontroller and the output of the comparator 402 is at a logical high level indicating that the battery voltage has fallen below the desired programmed voltage, the output of the AND gate 416 goes to a logical high level enabling the DC/DC boost converter 166. If either of the inputs in the AND gate 416 are at a logical low level indicating either that the DC/DC boost converter 166 is to be disabled via the enable input or that the battery voltage exceeds the desired output voltage, the output of the AND gate 416 is at a logical low level which will disable the DC/DC boost converter 166.

The output of the AND gate 416 is also provided to the gate of a switching transistor 418 through an inverter 419. The switching transistor 418 is connected between the input voltage node 404 and the output node 420 of the DC/DC boost converter 166 from which the boosted voltage $V_{DD}$ is provided. When the DC/DC boost converter 166 is disabled, the switch 418 is turned on to directly connect the input voltage VBAT at node 404 to the output voltage node $V_{DD}$ at node 420. This enables the battery voltage to be provided as the system voltage $V_{DD}$ without any use of the disabled DC/DC boost converter 166. When the output of the AND gate 416 enables the DC/DC boost converter 166, the switch 418 is turned off disconnecting node 404 from node 420 and the output voltage $V_{DD}$ is provided from the boost converter 166 responsive to the provided input voltage VBAT.

The DC/DC boost converter 166 may be placed in various configurations of the bypass mode responsive to a pair of digital input bits SEL_BYPASS that are provided from an associated control register. The two bit configuration may place the DC/DC boost converter 166 in one of a no bypass mode, optional bypass mode with clock, optional bypass mode with non clock and a forced bypass mode with non clock. The "00" bit configuration indicates a no bypass mode wherein the DC/DC boost converter 166 always is turned on no matter what the relationship between the input battery voltage and a programmed output voltage. The "01" configuration indicates an optional bypass with clock mode of operation wherein the DC/DC boost converter enters the bypass mode if the battery voltage exceeds the desired program voltage and the DC/DC clock remains on. In the "10" configuration, the DC/DC boost converter is also in an optional bypass mode with non clock wherein the converter is disabled if the battery voltage is greater than the programmed output voltage but the clock on the DC/DC converter remains off. This will provide a further power savings by turning off the clock of the DC/DC boost converter 166 when it was disabled. Finally, an "11" configuration places the DC/DC boost converter 166 in a forced bypass mode of operation wherein the converter and its associated clock are both turned off no matter what the relationship between the input voltage and a programmed output voltage. This configuration would be used when it was not necessary to have an input voltage above a particular level within the operating specifications of the device. The output bypass flag provided by the circuitry would provide a "1" when the DC/DC boost converter 166 was in the bypass mode of operation and a "0" when the converter was not in a bypass mode of operation.

Figure 5:
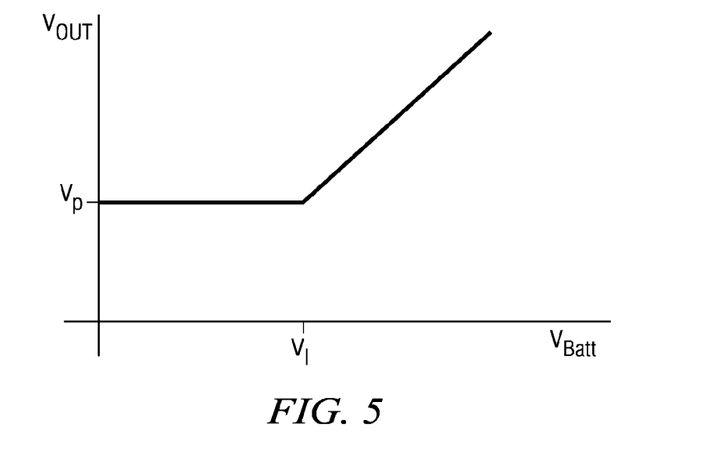
FIG. 5 illustrates the output voltage with respect to the input voltage of the system using the DC/DC boost converter in bypass mode.

Thus, the output voltage vs. input voltage profile of the circuit would operate in the manner illustrated in FIG. 5. When the input voltage VBAT is below a particular level $V_1$, the output voltage is provided by the DC/DC boost converter 166 at its programmed level $V_P$. When the battery voltage is above the voltage level $V_1$ that is equal to the program voltage $V_P$, the battery voltage and the output voltage increase linearly with respect to each other as the battery voltage VBAT is connected directly to the $V_{DD}$ system voltage node which is provided as $V_{OUT}$. This enables the microcontroller unit to provide a system voltage $V_{DD}$ that does not fall below the level $V_P$ no matter what the battery voltage.

Figure 6:
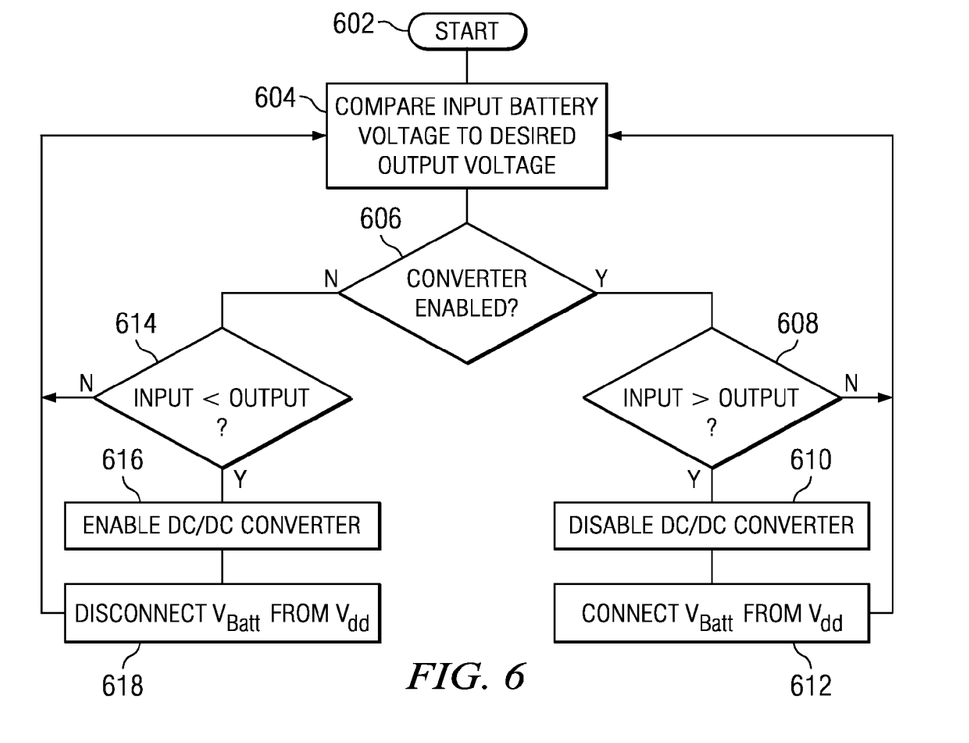
FIG. 6 is a flow diagram describing the operation of the DC/DC boost converter with bypass mode.

Referring now to FIG. 6, there is illustrated a flow diagram describing the operation of the optional bypass feature of the DC/DC boost converter 166 as described herein above. The process is initiated at step 602 wherein operation of the microcontroller unit with the DC/DC boost converter 166 is initiated after necessary system power on functions. At step 604, the input battery voltage is compared to a program output voltage of the DC/DC boost converter 166. Inquiry step 606 determines whether the DC/DC boost converter is presently enabled. If so, inquiry step 608 determines if the input voltage is greater than the programmed output voltage of the DC/DC boost converter 166. If the input voltage is not greater, control passes back to step 604 and the input battery voltage is again compared with the programmed output voltage. If the input battery voltage is determined to be greater than the programmed output voltage at inquiry step 608, the DC/DC boost converter is disabled at step 610. After the DC/DC boost converter is disabled or substantially concurrently therewith, the VBAT voltage provided from the battery is connected with the $V_{DD}$ voltage node at step 612 such that the battery voltage is directly provided as $V_{DD}$ within the microcontroller circuit. Control then passes back to step 604.

If inquiry step 606 determines that the DC/DC boost converter 166 is not enabled, inquiry step 614 determines if the input battery voltage is less than the programmed output voltage. If so, the DC/DC boost converter is enabled at step 616 and the battery voltage is disconnected from being directly provided as $V_{DD}$ at node 618 and control passes back to step 604.

A DC/DC boost converter 166 operating in this manner provides a number of advantages for a microcontroller unit including the converter. The converter without bypass mode uses about 150 microamps to maintain normal operation. Within the optional bypass mode, the converter uses between 1.9 and 2.8 microamps for battery voltages between 1.8 and 3.6 volts. Within the forced bypass mode, the current requirements are 0 over the voltage range of 1.8 to 3.6 volts.

It will be appreciated by those skilled in the art having the benefit of this disclosure that this DC/DC boost converter provides a manner for saving power with a bypass mode of operation. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. An integrated circuit package, comprising:
    a processing core for operating on a set of instructions to carry out predefined processes;
    digital peripheral devices connected with the processing core;
    analog peripheral devices connected with the processing core;
    a DC/DC boost converter for providing an output voltage at a programmed level for the processing core, the digital peripheral devices and the analog peripheral devices, the DC/DC boost converter including a first mode of operation configured by the processing core wherein the DC/DC boost converter is enabled responsive to an input battery voltage falling below the programmed level of the output voltage and a second mode of operation configured by the processing core wherein the DC/DC boost converter is disabled responsive to the input battery voltage being above the programmed level of the output voltage; and
    a comparator for comparing the input battery voltage with the programmed level of the output voltage and generating a control output for enabling and disabling the DC/DC boost converter responsive to the comparison.

2. The integrated circuit package of claim 1, further including a logic circuit for generating a first control signal responsive to the output of the comparator and an enable signal for enabling and disabling the DC/DC boost converter and for generating a second control signal for connecting the DC/DC converter to provide the output voltage in the first mode of operation and for connecting the input battery voltage to provide the output voltage in the second mode of operation.

3. The integrated circuit package of claim 1, further including a voltage divider network for providing the input battery voltage at a first input of the comparator.

4. The integrated circuit package of claim 1, wherein the logic circuit further includes a switch for directly connecting the input battery voltage to provide the output voltage, the switch closing to connect the input battery voltage to provide the output voltage in the second mode of operation and the switch opening to disconnect the input battery voltage from the output voltage in the first mode of operation.

5. The integrated circuit package of claim 1, wherein the DC/DC boost converter further includes a third mode of operation wherein the DC/DC boost converter is always enabled no matter what the input battery voltage value and a fourth mode of operation wherein the DC/DC boost converter is always disabled no matter what the input battery voltage value.

6. An integrated circuit package, comprising:
    a processing core for operating on a set of instructions to carry out predefined processes;
    digital peripheral devices connected with the processing core;
    analog peripheral devices connected with the processing core;
    a DC/DC boost converter for providing an output voltage at a programmed level for the processing core, the digital peripheral devices and the analog peripheral devices, the DC/DC boost converter including a first mode of operation configured by the processing core wherein the DC/DC boost converter is enabled responsive to an input battery voltage falling below the programmed level of the output voltage and a second mode of operation configured by the processing core wherein the DC/DC boost converter is disabled responsive to the input battery voltage being above the programmed level of the output voltage;
    circuitry for comparing the input battery voltage with the programmed level of the output voltage and generating a control output to enable or disable the DC/DC boost converter responsive to the comparison; and
    a switch responsive to the control output for directly connecting the input battery voltage to provide the output voltage, the switch closing to connect the input battery voltage to provide the output voltage in the second mode of operation and the switch opening to disconnect the input battery voltage from the output voltage in the first mode of operation.

7. The integrated circuit package of claim 6, wherein the circuitry for comparing further comprises a comparator.

8. The integrated circuit package of claim 7, further including a logic circuit for generating a first control signal responsive to the output of the comparator and an enable signal for the enabling and disabling DC/DC boost converter and for generating a second control signal for connecting the DC/DC converter to provide the output voltage in the first mode of operation and for connecting the input battery voltage to provide the output voltage in the second mode of operation.

9. The integrated circuit package of claim 7, further including a voltage divider network for providing the input battery voltage at a first input of the comparator.

10. The integrated circuit package of claim 6, wherein the DC/DC boost converter further includes a third mode of operation wherein the DC/DC boost converter is always enabled no matter what the input battery voltage value and a fourth mode of operation wherein the DC/DC boost converter is always disabled no matter what the input battery voltage value.

11. A method for operating a DC/DC boost converter, comprising the steps of:
    monitoring an input battery voltage;
    comparing the input battery voltage with a desired output voltage;
    disabling the DC/DC boost converter if the input battery voltage exceeds the desired output voltage; and
    enabling the DC/DC boost converter if the desired output voltage exceeds the input battery voltage.

12. The method of claim 11, further including the step of controlling connection of the input battery voltage as an output voltage responsive to the relationship of the input battery voltage with respect to the desired output voltage.

13. The method of claim 12, wherein the step of controlling connection of the input battery voltage further comprises the steps of:
  connecting the input battery voltage to provide the output voltage if the input battery voltage exceeds the desired output voltage; and
  disconnecting the input battery voltage from providing the output voltage if the desired output voltage exceeds the input battery voltage.

14. The method of claim 11, further including the step of enabling the DC/DC boost converter to operate without regard to the input battery voltage.

15. The method of claim 14, further including the step of disabling the DC/DC boost converter without regard to the input battery voltage.

* * * * *